United States Patent
Klein et al.

(10) Patent No.: US 8,639,991 B2
(45) Date of Patent: Jan. 28, 2014

(54) OPTIMIZING PERFORMANCE OF AN APPLICATION

(75) Inventors: Udo Klein, Maximiliansau (DE); Martin Hartig, Speyer (DE)

(73) Assignee: SAP AG, Walldorf (DE)

(*) Notice: Subject to any disclaimer, the term of this patent is extended or adjusted under 35 U.S.C. 154(b) by 174 days.

(21) Appl. No.: 12/972,329

(22) Filed: Dec. 17, 2010

(65) Prior Publication Data
US 2012/0159259 A1   Jun. 21, 2012

(51) Int. Cl.
G06F 11/00   (2006.01)

(52) U.S. Cl.
USPC ........... 714/55; 714/25; 714/38.1; 714/38.12; 714/46; 717/124; 717/131

(58) Field of Classification Search
USPC ........... 714/25, 38.1, 38.12, 55; 717/124, 131
See application file for complete search history.

(56) References Cited

U.S. PATENT DOCUMENTS

| | | | |
|---|---|---|---|
| 6,275,955 B1 * | 8/2001 | Klein et al. | 714/38.12 |
| 6,697,973 B1 * | 2/2004 | Baumeister et al. | 714/55 |
| 6,779,134 B1 * | 8/2004 | Laviolette et al. | 714/38.12 |
| 6,961,928 B2 * | 11/2005 | Aarts et al. | 717/131 |
| 7,017,082 B1 * | 3/2006 | Yip et al. | 714/38.1 |
| 7,383,470 B2 * | 6/2008 | Canning et al. | 714/38.11 |
| 7,559,060 B2 * | 7/2009 | Schmidt et al. | 718/100 |
| 7,774,784 B2 * | 8/2010 | Fields et al. | 718/104 |
| 8,239,709 B2 * | 8/2012 | Hom et al. | 714/38.1 |
| 8,266,479 B2 * | 9/2012 | Chan et al. | 714/47.1 |
| 8,347,149 B2 * | 1/2013 | Stubbs et al. | 714/47.1 |
| 2006/0005085 A1 * | 1/2006 | Zunino et al. | 714/47 |
| 2008/0097628 A1 * | 4/2008 | Weatherhead et al. | 700/54 |
| 2008/0127067 A1 * | 5/2008 | Aubertine et al. | 717/115 |
| 2012/0005531 A1 * | 1/2012 | Manuzak et al. | 714/25 |

OTHER PUBLICATIONS

"Watchdog Timer" http://en.wikipedia.org/wiki/Watchdog_timer Retrieved Jul. 12, 2013.

* cited by examiner

*Primary Examiner* — Joshua P Lottich
(74) *Attorney, Agent, or Firm* — Mintz Levin Cohn Ferris Glovsky and Popeo, P.C.

(57) ABSTRACT

An indication of a start of an execution of a process can be received, and a time counter associated with measuring a time elapsed can be initiated by the execution of the process. The time elapsed by the execution of the process can be compared with a predetermined threshold timeout value, and a report indicating the time elapsed by the execution of the process and whether the elapsed time exceeded the predetermined threshold timeout value can be automatically generated.

17 Claims, 8 Drawing Sheets

OPTIMIZING PERFORMANCE OF AN APPLICATION

TECHNICAL FIELD

This disclosure relates generally to data processing and, in particular, to systems and methods for optimizing performance of applications, for example an application that runs on one or more computing systems.

BACKGROUND

In today's technology-dependent world, optimizing performance of computing systems is vital to operation of such systems. A variety of applications can be running on those systems. Users, other applications, components, etc. can depend on their proper operation. Performance optimization of large applications can be difficult. Some conventional approaches include breaking down applications into components and assigning "performance budgets" to the components. A performance budget can be a predetermined period of time that is allotted to running that application and/or generating some form of an output within that predetermined period of time. These budgets can be compared to actual measurements and can be presented to management and/or developers for evaluation of compliance with budgets and/or efficient/inefficient performance of a particular application and/or its components. This implies a potentially long turnaround time between changes in the system and detection of what possibly caused an impact on performance of an application. Currently, there appears to be no technical means to enforce compliance with these agreed-upon performance budgets, which in turn, causes disregard of performance issues and degradation of an overall product outputted by an application or system.

Some currently available approaches include the use of watchdog timers, which can include computer hardware and/or software timers that trigger a system reset or other corrective action if a main program, due to some fault condition, such as a hang, neglects to regularly service the watchdog. A watchdog timer's purpose is typically to bring the system back from the unresponsive state into normal operation. Some watchdog timers can include additional features such as saving debugging information into memory. This information can be used for debugging the problem that caused the fault. Some conventional watchdog timers ensure that if completion of its information saving task is not reported within a certain amount of time, the system will reset with or without the information saved. The most common use of watchdog timers is in embedded systems, where a specialized timer can be a built-in unit of a microcontroller. Watchdog timers can also trigger fail-safe control systems to move into a safety state, such as turning off motors, high-voltage electrical outputs, and other potentially dangerous subsystems, until the fault is cleared. Conventional watchdog timers include chips that are external to a processor or included within the same chip as the CPU. However, these watchdog timers are typically incapable of either enforcing performance budgets for an application and/or its components or providing immediate feedback to developers concerning performance violations so that timely corrective actions can be undertaken.

However, there is a need for tracking and enforcing application performance budgets. Further, there is a need to automate such tracking and enforcing to improve timely resolution of system faults.

SUMMARY

In one aspect, an indication of a start of an execution of a process is received, and a time counter associated with measuring a time elapsed by the execution of the process is initiated. The time elapsed by the execution of the process is compared with a predetermined threshold timeout value, a report indicating the time elapsed by the execution of the process and whether the elapsed time exceeded the predetermined threshold timeout value is automatically generated, and the report is promoted.

In optional variations, one or more of the following features can also be included. In response to a determination can be made that the elapsed time has exceeded the predetermined threshold timeout value, at least one of automatically terminating the time counter and initiating a debugger can be performed. The time counter can be automatically initiated in response to encountering a fault during the execution of the process. The time counter can be automatically initiated and/or automatically disabled at any time before, during or after execution of the process. The process can include a process scope, and an action to be performed when the elapsed time exceeds the predetermined threshold timeout value can be selected based on the process scope from a group consisting of terminating the process, initiating a debugger, logging the exceeding of the threshold time, and allowing the process to continue. The selected action can be performed upon determining that the elapsed time has exceeded the predetermined threshold timeout value. The process scope can include one of a user-specific scope, a server-wide scope, and a system-wide scope. The time counter can be automatically initiated for a portion of the process. The promoting of the report can optionally include at least one of displaying the report via a visual display device, generating an alert and delivering the alert to an individual or group tasked with quality control for development of a software architecture that includes the process, storing the report on a data storage device, and aggregating at least part of the report into an analysis of progress toward achieving quality goals associated with development of the software architecture that includes the process.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address these and potentially other issues with currently available solutions, one or more implementations of the current subject matter provide methods, systems, articles or manufacture, and the like that can, among other possible advantages, provide systems and methods for optimizing performance of at least one process, call, function, subroutine, etc. in a computing system through automated monitoring and detection of time elapsed by such process, call, function, subroutine, etc.

Figure 1:
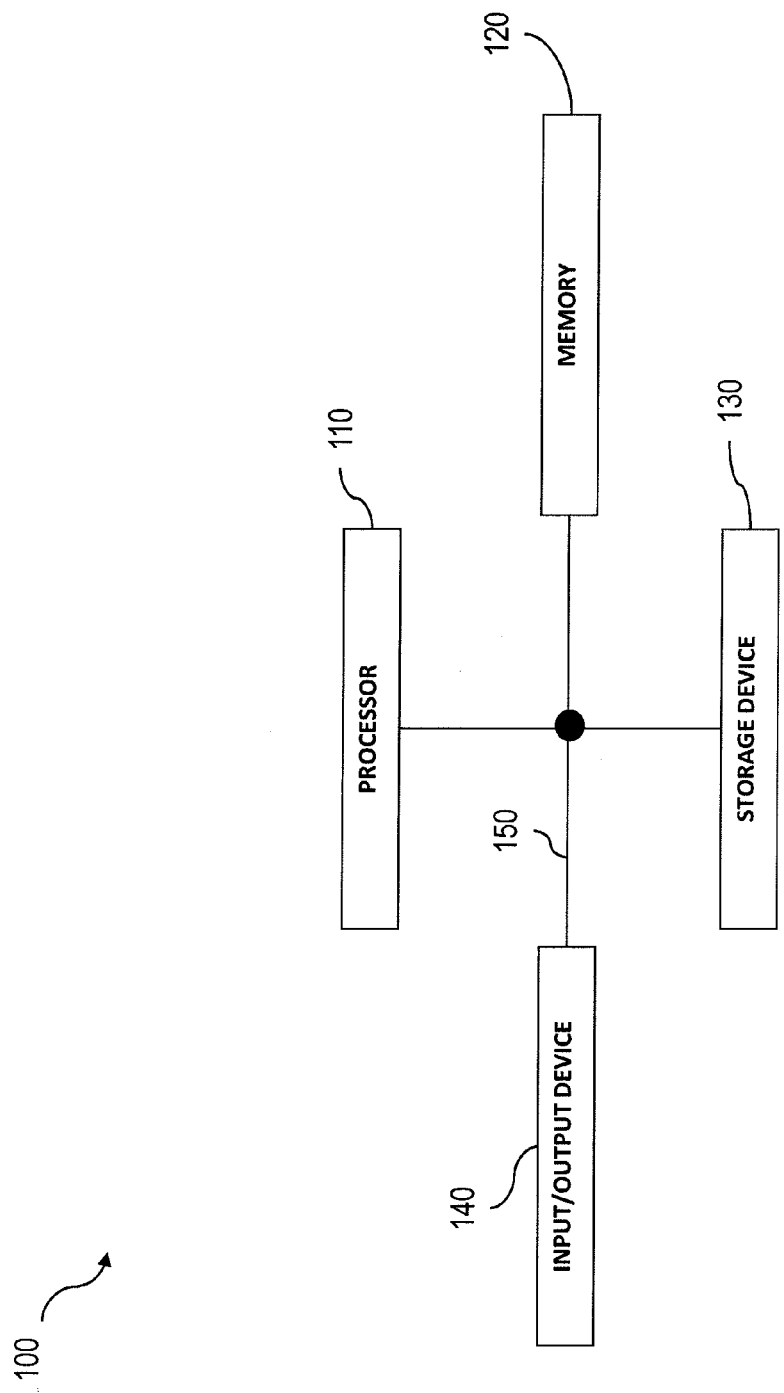
FIG. 1 illustrates a system for optimizing performance of a process.
Figure 2:
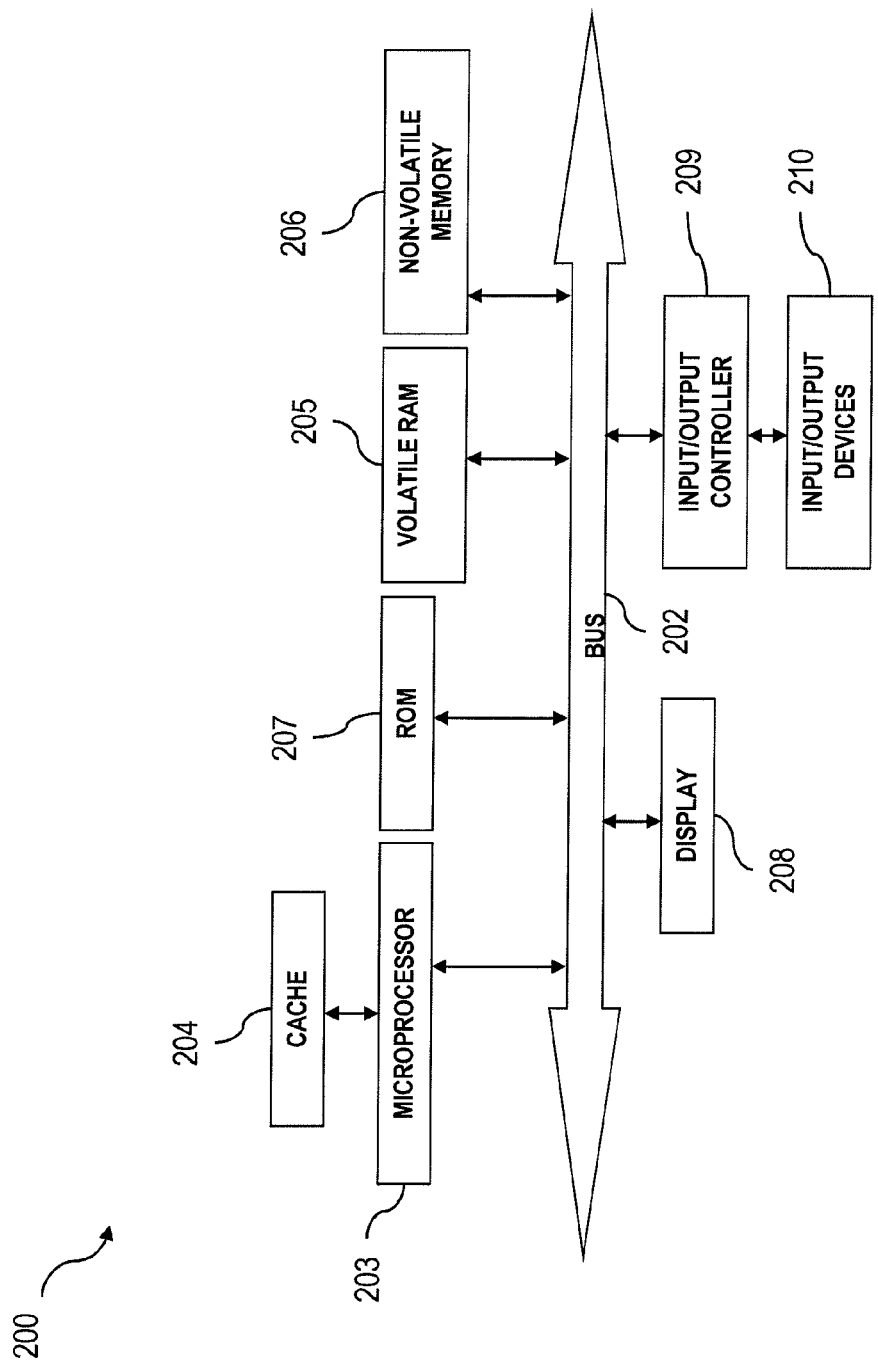
FIG. 2 illustrates another system for optimizing performance of a process.

FIG. 1 illustrates an example of a general computing system 100 consistent with some implementations of the current subject matter for optimizing performance of an application, according to some implementations of the current subject matter. The system 100 can include at least one processor 110, a memory 120, a storage device 130 and an input/output device 140. Each of the components 110, 120, 130 and 140 can be interconnected using a system bus 150. The processor 110 can be configured to process instructions for execution within the system 100. In some implementations, the processor 110 can be a single-threaded processor. In alternate implementations, the processor 110 can be a multi-threaded processor. The processor 110 can be further configured to process instructions stored in the memory 120 or on the storage device 130, including receiving or sending information through the input/output device 140. The memory 120 can store information within the system 100. In some implementations, the memory 120 can be a computer-readable medium. In alternate implementations, the memory 120 can be a volatile memory unit. In yet some implementations, the memory 120 can be a non-volatile memory unit. The storage device 130 can be capable of providing mass storage for the system 100. In some implementations, the storage device 130 can be a computer-readable medium. In alternate implementations, the storage device 130 can be a floppy disk device, a hard disk device, an optical disk device, a tape device, or any other type of storage device. The input/output device 140 can be configured to provide input/output operations for the system 100. The input/output device 140 can optionally include one or more of a keyboard, a pointing device, a display unit for displaying graphical user interfaces and/or receiving touch screen input, and the like FIG. 2 illustrates another example of a general computing system 200 consistent with some implementations of the current subject matter that can be used for optimizing performance of an application. The general computing system 200 can be used as part of a client system and/or a server system. While FIG. 2 illustrates various components of a computer system, it is not intended to limit this disclosure to any particular architecture or manner of interconnecting the components. It will also be appreciated that network computers and other data processing systems having fewer components or perhaps more components can also be used with the current subject matter.

As shown in FIG. 2, the general computing system 200 can be a data processing system that includes a bus 203 coupled to at least one of a microprocessor 205, a read only memory (ROM) 207, a volatile random access memory (RAM) 209, and a non-volatile memory 211. The microprocessor 205 can be configured to retrieve instructions from one or more of the memories 207, 209, 211 and execute the instructions to perform operations of the system as discussed below. The bus 203 can be configured to interconnect these various components together and can also interconnect one or more of the components 205, 207, 209, and 211 to a display controller and display device 213 and to peripheral devices such as input/output (I/O) devices which can be mice, keyboards, modems, network interfaces, printers and other devices which are well known in the art. The input/output devices 215 can be coupled to the system through input/output controllers 217. The volatile RAM 209 can be implemented as a dynamic RAM (DRAM) requiring power continually in order to refresh or maintain the data in the memory.

The non-volatile memory 211 can be a mass storage device, such as for example a magnetic hard drive, a magnetic optical drive, an optical drive, a DVD ROM, solid state "flash" memory, or other types of memory systems which maintain data even after power is removed from the system. The non-volatile memory 211 can optionally be a random access memory. While FIG. 2 shows that the non-volatile memory 211 can be a local device coupled directly to the rest of the components in the data processing system, it will be understood that the current subject matter can be configured to utilize a non-volatile memory 211 which can be remote from the system, such as a network storage device which can be coupled to the data processing system through a network interface such as a modem or Ethernet interface or over the Internet. The bus 203 can include one or more buses connected to each other through various bridges, controllers and/or adapters.

Figure 3:
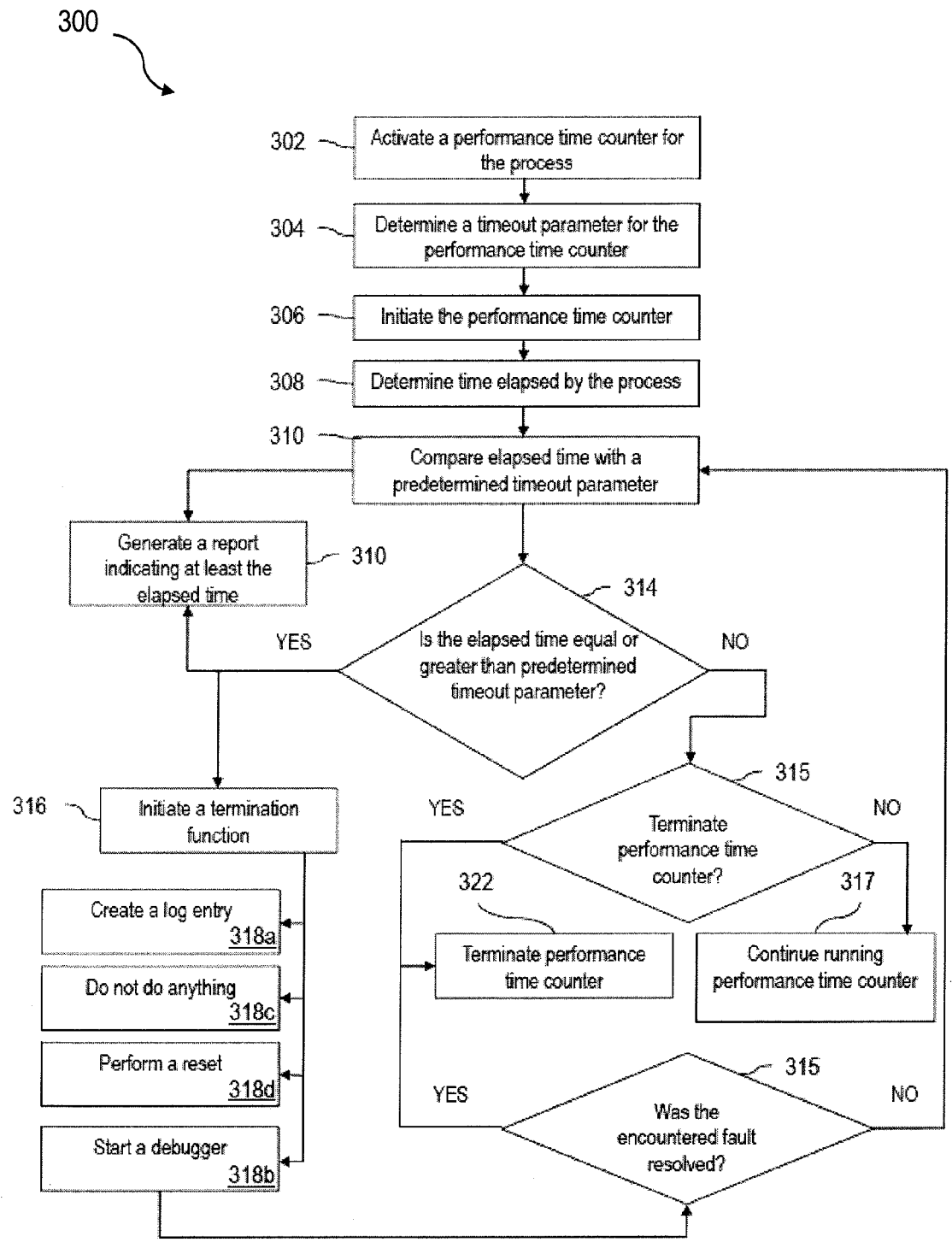
FIG. 3 is a process flow chart illustrating features of a method.

FIG. 3 is a process flow chart 300 showing features of a method 300 consistent with at least some implementations of the current subject matter for optimizing performance of a process or processes in a computing system. Such a method can in some implementations, be performed by the systems shown in and discussed in connection with FIG. 1 or 2 or by any other system. A process can be an application running in a computing system or a specific programming block, function, process, or any other element of an application that can be executed within an application or by an application. In some implementations, the current subject matter can be configured to optimize performance of multiple processes as well as performance of one process based on performance of other processes. The current subject matter is not limited to the above-referenced forms of processes and the concepts discussed by the present application can be equally applicable to any other forms of processes. For ease of illustration, the following discussion is presented in terms of a process running or otherwise executed within or by an application implemented within the computing system shown in FIG. 1 or 2 or any other system.

As shown in FIG. 3, the system can be configured to detect at 302 that one of its processes has encountered a fault. A fault can be a system condition that prevents further execution of a process as well as generation of an output designated by that particular process. For example, if a process, during its execution, is supposed to call upon a particular subroutine and that subroutine is no longer available, the process can encounter a fault. Other examples of faults are possible. In some implementations, a process can have certain mechanisms in place that are configured to resolve the fault and allow further execution of the process. In the above example, if the particular subroutine is no longer available, the process, in order to overcome the encountered fault, can search for an alternate subroutine, and, upon finding one, execute that subroutine, which can resolve the fault and allow continued execution of the process. However, in some implementations, the process can be configured to not have fault solution capabilities in place and/or can be configured to not find one. This can cause the fault to persist, thereby preventing further execution of the process and possible, stall the entire computing system. To prevent that from happening, the current subject matter can be configured to implement a performance time counter component. In some implementations, the performance time counter component can be a collection of source code imbedded into the process or it can be separate component that is communicatively coupled to a processor configured to execute the process in question.

Figure 5:
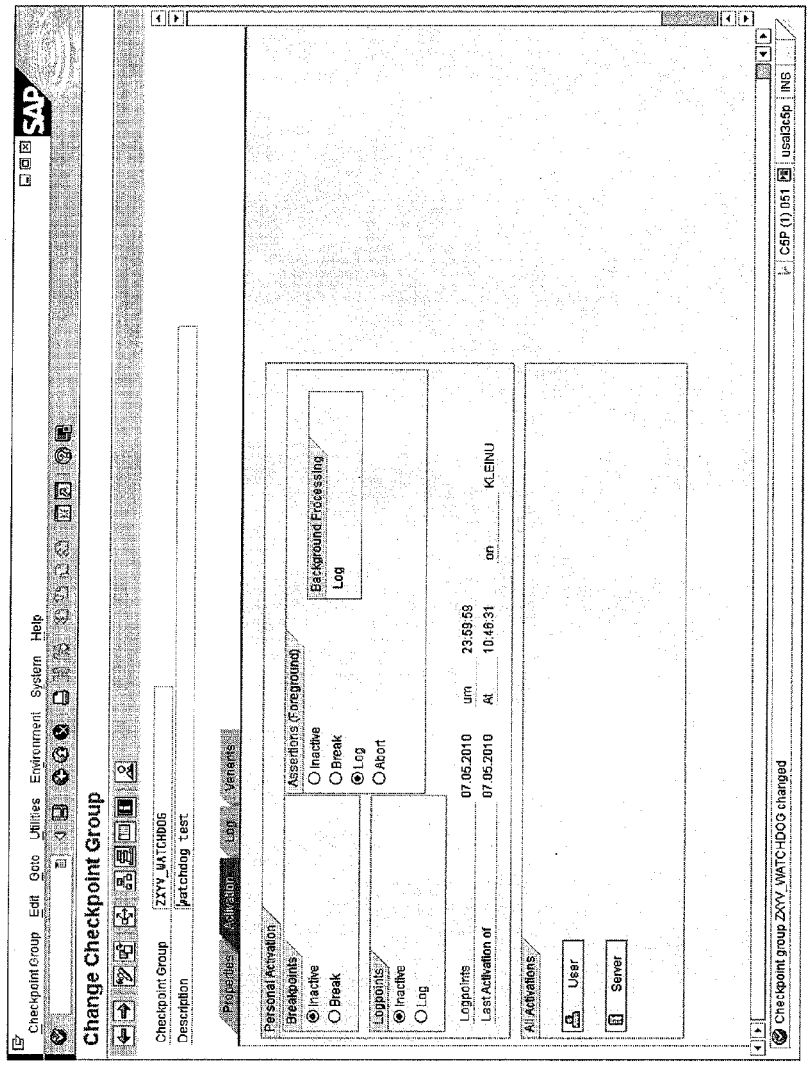
FIG. 5 illustrates an interface for a performance time counter.

In some implementations, the performance time counter component can be activated upon the process encountering a fault. Alternatively or in addition, it can be activated during the entire time the process (or call, function, subroutine, etc.) is being executed. FIG. 3 shows an example in which a counter can be activated for the entire process, as shown at 304. FIG. 5, discussed in more detail below, illustrates an illustrative example of an interface 500 for activation of a performance time counter component. At 306, the user or a system can determine various parameters of the performance time counter component. In some implementations, such parameters can include, but are not limited to, a predetermined timeout value. The predetermined timeout value can be configured to include a threshold value or values for each "call", function, subroutine of the process and/or the entire process running time. Once such time thresholds are determined, at 308, the performance time counter can be initiated. In some implementations, the performance time counter can be initiated together with the initiation of the process and/or initiation by or during the process of a particular call, function, and/or subroutine, etc. of the process.

At 310, the time or times allowed for the entire process to be executed and/or a particular call, function, and/or subroutine to be executed can be determined. The determined time or times can then be compared to the predetermined timeout value corresponding to the respective process, call, function, and/or subroutine at 312. The time elapsed by the process (call, function, subroutine, etc.) can be reported to the user and/or to another component within the system at 322. In some implementations, the report can contain information concerning the process, call, function subroutine, or the like and optionally any other relevant aspects, such as for example time elapsed; a predetermined threshold for each process, call, function, subroutine, etc. being monitored; any actions taken or to be taken; an indication of a reason for an application or application component exceeding any predetermined threshold or thresholds (for example a line or a portion in a source code causing such excess in time used by the process, etc.); and/or any other desired information. The report can be configured as desired either by the user and/or the system and/or any of its components.

If at 314 the time elapsed during execution of the process and/or one or more of its calls, functions, and/or subroutines, etc. is determined to equal or exceed the predetermined timeout values or thresholds, at 316 a termination function can be initiated. At 322, the exceeded time can also be reported to the user and/or to another component within the system. In some implementations, the termination function can include one or more actions 318a, 318b, and 318c undertaken by the system upon detecting that the predetermined timeout value(s) or threshold(s) have been exceeded. At 318a, upon detection of excess time being taken by the process (and/or call, function, subroutine), a log entry can be created in an execution log for that process (and/or call, function, subroutine). Alternatively and/or in combination with the creation of the log entry at 318a, a debugger process, call, function and/or subroutine can be executed at 318b, for example to resolve the encountered fault. In some implementations, the debugger can be configured to include its own performance time counter or be monitored by the performance time counter that originally monitored the process. The debugger's performance time counter can be configured in a similar fashion as the performance time counter for the process 300, e.g., it can include various timeout threshold parameters, which, if exceeded, cause execution of debugger termination functions.

Figure 7:
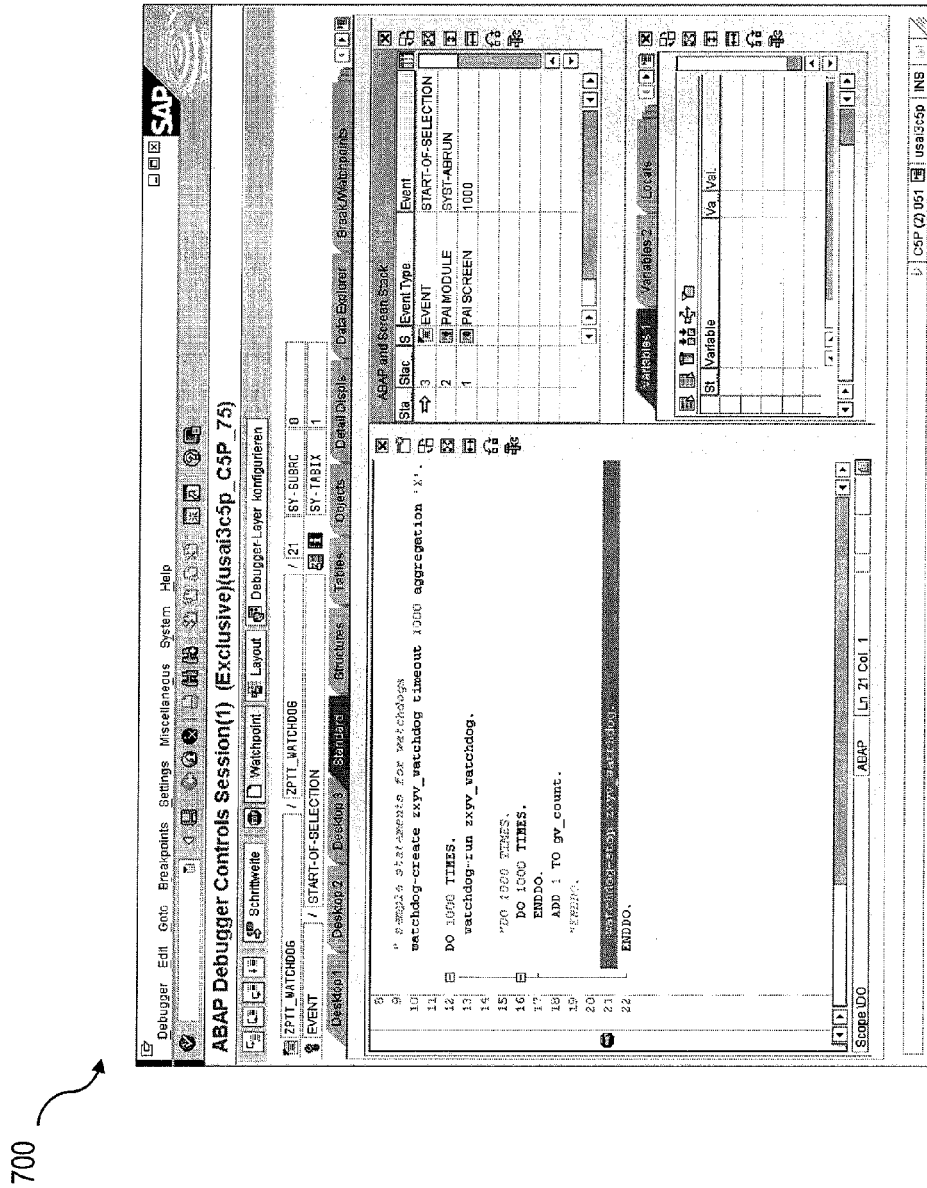
FIG. 7 illustrates an interface for a performance time counter triggering a debugger.

FIG. 7 illustrates an exemplary debugger interface 700, which indicates that the debugger has been activated as a result of the performance time counter being activated. Further, alternatively and/or in addition to the creation of the log entry at 318a and execution of the debugger process at 318b, execution of the process can be terminated and/or a restart of this process can be initiated at 318c. Alternatively or in addition, at 318d no actions can be taken upon detection of excess of the predetermined timeout values. Termination actions 318 consistent with the current subject matter are not limited to those illustrated and discussed in connection with FIG. 3 and other functions are possible.

Further with reference to FIG. 3, if at 314 it is determined that the time elapsed during execution of the process (and/or call, function, subroutine) is not greater than or equal to the predetermined timeout threshold, a determination can be made at 315 whether or not to terminate the performance time counter. If so, then the counter can be terminated at 322. Otherwise, the counter can be configured to continue to run at 317. At 320, if a fault was encountered and the counter was monitoring the fault, a determination can be made whether the detected fault has been resolved. If it has been resolved, then the performance time counter can be terminated and the process allowed to proceed. Otherwise, the processing can be configured to return to 312.

Figure 6:
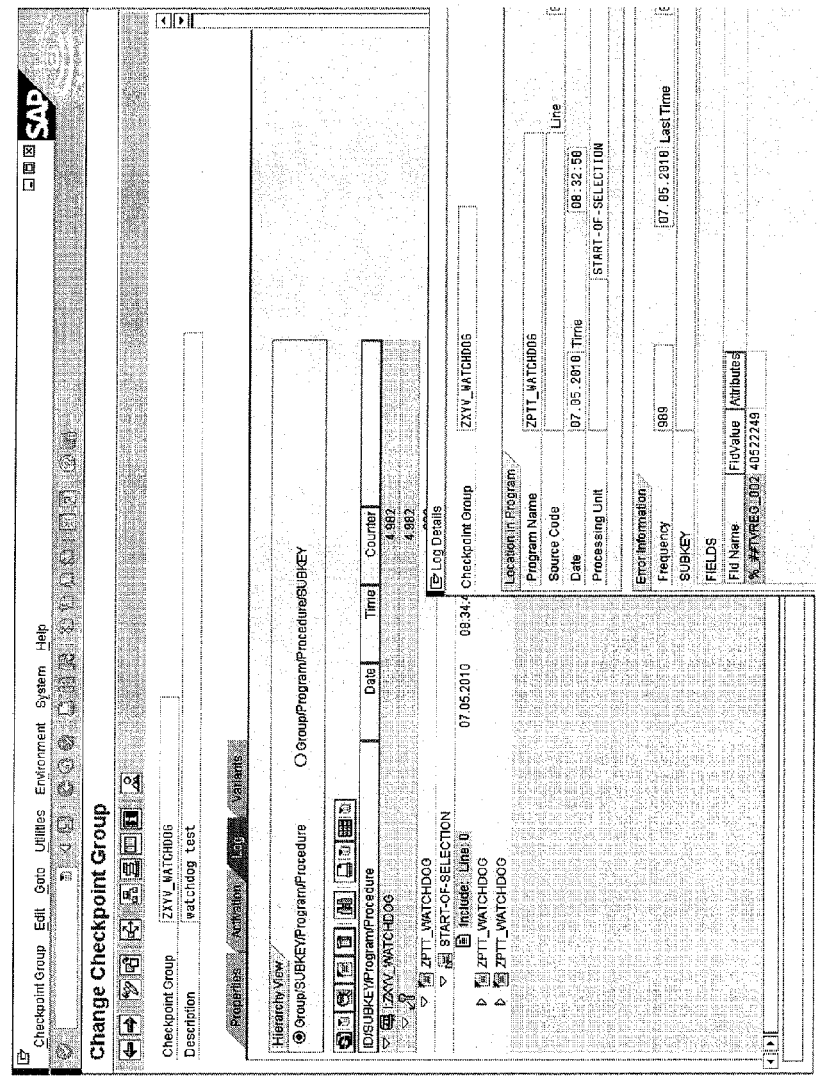
FIG. 6 illustrates an interface for a triggered performance time counter.

FIG. 6 illustrates an illustrative example of an interface 600 for a performance time counter, according to some implementations of the current subject matter. As shown in FIG. 6, the performance time counter has been activated and a detection has been made that the time performance counter's predetermined value has been exceeded.

Figure 4:
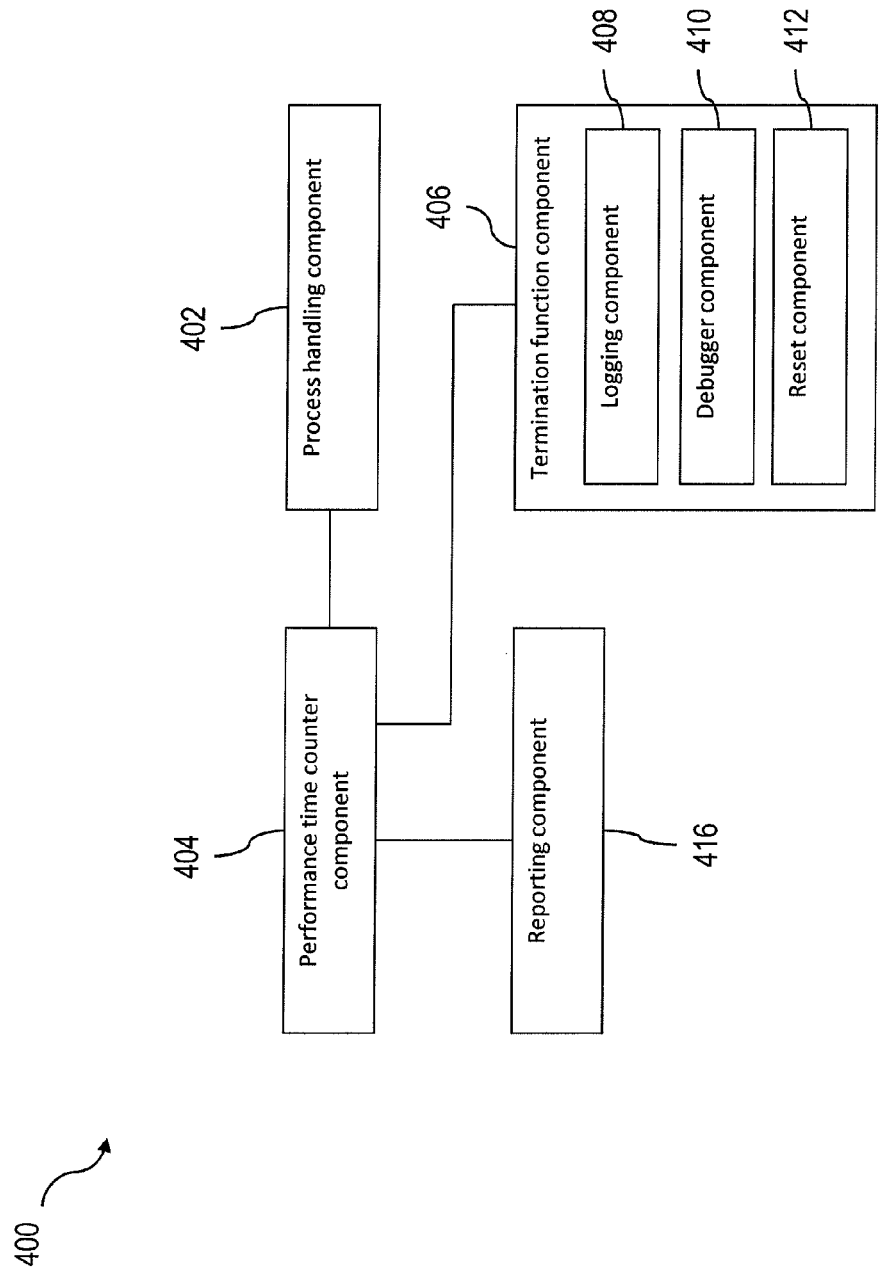
FIG. 4 illustrates a system for performing a process consistent with implementations described herein.

FIG. 4 illustrates an example of a system 400 consistent with some implementations of the current subject matter for optimizing performance of a process and configured to perform the steps of the process 300 shown in FIG. 3. In some implementations, the system 400 can include a process handling component 402, which can be configured to deal with various aspects of running execution of a particular process, application, or any part thereof, including but not limited to, a call, a function, a subroutine, etc. The process handling component 402 can be a processor, such as for example processing equipment shown and discussed in connection with FIG. 1 or 2. The system 400 can further include a performance time counter component 404 that can be configured to be communicatively coupled to the process handling component 402. In some implementations, the component 404 can be configured to be software and/or a software-hardware combination. The component 404 can be activated by the process handling component 402 or any other entity by means of receiving a signal (either through a wired, wireline, or wireless connection), upon calling of a certain function, and/or receiving a particular trigger. In some implementations, the trigger can include, but is not limited to, activation of a process that can be monitored by the performance time counter component 404, receiving an indication of a fault occurring during execution of a process, a call by a function, subroutine, etc., and/or any other way of activating the component.

In some implementations, the component 404 can be configured to monitor time elapsed during execution of an entire process and to generate an alert and/or perform any other action in the event the time elapsed during execution of the process exceeds certain predetermined threshold (e.g., a performance budget), even if no fault occurred. The component 404 can also be configured to monitor time elapsed by execution of a particular portion of the process, e.g., a call, a function, a subroutine, etc., and similarly generate an alert and/or perform any other action if such time exceeds a predetermined threshold allotted for that portion of the process, even if no fault occurred. Further, the component 404 can be configured to monitor time that elapsed during an attempt by the process to resolve a particular fault and likewise generate an alert and/or perform any other action in the event that time exceeded a predetermined threshold. The performance time counter component 404 can be configured to monitor and/or generate an alert with regard to any aspect of the process, as desired. The generated alerts and/or functions can be provided to the user (e.g., application developer) and/or to another portion of the system that can include or otherwise communicate with the component 404 for the user and/or another portion of the system to take any appropriate action and/or measure as needed. Each process, portion of the process, and/or particular fault can be configured to have its own predetermined time threshold, which if exceeded, can cause the performance time component 404 to generate an alert and/or perform any other desired action.

Further, the performance time component 404 can be configured to be disabled as desired by the user and/or any other portion of the system. For example, it can be desirable to disable the component 404 for certain processes, calls, functions, subroutines, etc. that can be specifically defined by the user or the system. Such disabling can be done manually by the user or automatically by the system upon detection of such processes, calls, functions, subroutines, etc. Additionally, the component 404 can be activated during development and/or testing of the computing systems and can be disabled in production computing systems that can be provided to the end user. In some implementations, such activation/disabling can be appropriately reversed upon execution of certain commands, functions, etc. Also, the component 404 can be disabled or activated before, during, and/or after initiation and/or execution of a particular process, call, function, subroutine, etc.

The component 404 can be also configured to monitor a process on a per process basis or monitor a collection of processes and generate a total time that has elapsed by the execution of such processes, where the process includes an entire process, a call, a function, a subroutine, etc. Further, the component 404 can be configured to exclude certain portions of the process(es), call(s), function(s), subroutine(s), etc. from the calculation of the total time elapsed by the process(es), call(s), function(s), subroutine(s), etc.

Once the time elapsed by a particular process, call, function, subroutine, etc., is determined, the component 404 can be configured to provide a report as to the time elapsed by that process. The report can be provided to the user and/or to another component within the system. Based on the report, appropriate actions can be taken by the user and/or the system. In some implementations, the report can be generated by a reporting component 416. The component 416 can be configured to display, print, store, and/or provide the report in any desired shape or form to the user and/or another component in the system.

Further, the component 404 can initiate a termination function, which can be performed by the termination function component 406. The component 406 can also be software and/or a combination of software and hardware and is capable of initiating various functions in the event of a detection of an excess time taken up by one or more particular process(es), call(s), function(s), subroutine(s), etc. Such functions can include generating a log entry in a log 408. The log 408 can be configured to be a database that is disposed within a memory device.

The component 406 can be further configured to initiate a debugger 410. The debugger 410 can be software and/or a combination of hardware and software. The debugger 410 can be configured to attempt to resolve the issues that can be encountered by process(es), call(s), function(s), subroutine(s), etc., such as errors, faults, or any other issues.

The component 406 can also cause a system reset, thereby terminating the process and restarting it from the beginning, using a resetting component 412. The component 412 can also be software and/or a combination of hardware and software. Alternatively or in addition to the functions performed by the components 408, 410, and 412, no action need be taken by the component 406.

Figure 8:
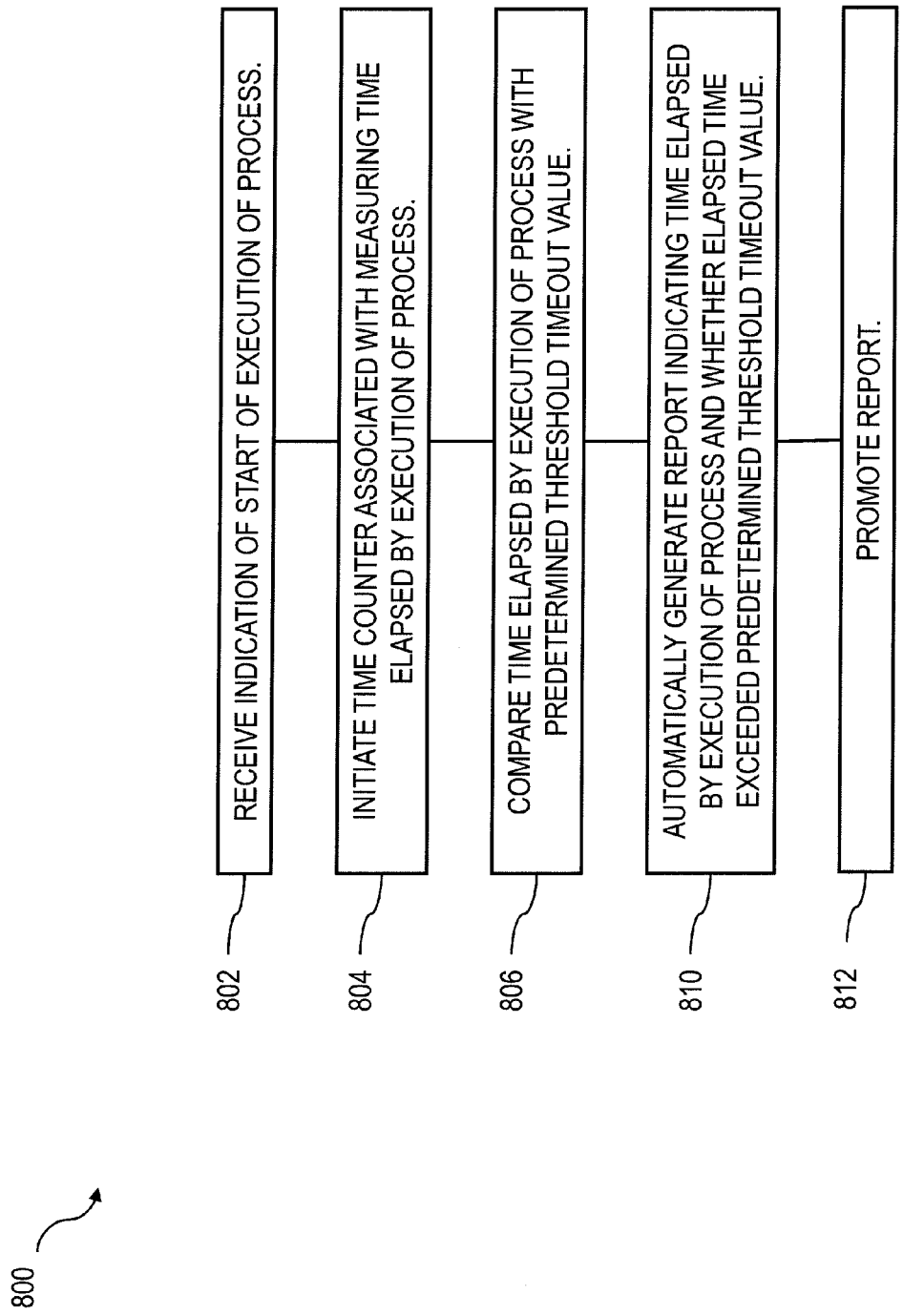
FIG. 8 is a process flow chart illustrating features of a method.

FIG. 8 shows a process flow chart 800 illustrating features of a method consistent with some implementations of the current subject matter. At 802, an indication of a start of an execution of a process is received, for example at one or more processors. A time counter associated with measuring a time elapsed by the execution of the process is initiated at 804. The time elapsed by the execution of the process is compared at 806 with a predetermined threshold timeout value. At 810, a report indicating the time elapsed by the execution of the process and whether the elapsed time exceeded the predetermined threshold timeout value is automatically generated. The report can be promoted at 812 for further use by a user or the system. The promoting can include, but is not limited to forwarding the report, for example via an electronic message or other data packet for example for display on a visual display device, for printing in hard copy (e.g. via a computer printer, fax machine, or the like), or for otherwise alerting one or more individuals or developers tasked with quality assurance and/or operations control individuals. Alternatively or in addition, all or part of the report can be stored, for example on a computer-readable storage device, and/or merged or otherwise compiled into a list, database, or the like of checkman data. As used herein, the term checkman refers to one or more error reports or the like that can be generated from a list of performance and operational health metrics. The checkman results can be analyzed along one or more dimensions, that can include but are not limited to packages, file names, responsible person, application area, issue type or severity, etc. The output from a checkman analysis can be used to verify quality goals. For example, in a software development process, the number of high priority alerts generated from the current subject matter for each component of the architecture under development can be closely monitored, particularly as completion of the product approaches.

In some implementations, the action or actions to be performed upon determination that the elapsed time on an application level watchdog has exceeded a predetermined threshold timeout value can be selected based on a scope of the process being monitored. For example, the scope of a process can be user-specific, server-specific, system-specific, or the like. Alternatively, a process may have no scope. One or more actions, potentially including but not necessarily limited to terminating the process, initiating a debugger, logging the exceeding of the threshold time, and allowing the process to continue, can be selected based on the process scope and then performed upon determining that the elapsed time has exceeded the predetermined threshold timeout value.

Some of the advantages of the implementations of the current subject matter can include automated monitoring and detection of time taken up by various process(es), call(s), function(s), subroutine(s), etc. in a computing system and providing appropriate and timely feedback to the user(s) (e.g., system developers) and/or other components within the system. This allows for faster resolution of any issues that systems can be having with execution of process(es), call(s), function(s), subroutine(s), etc.

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed:

1. A non-transitory computer program product comprising a machine-readable medium storing instructions that, when executed by at least one processor, cause the at least one processor to perform operations comprising:
    receiving, by the at least one processor, an indication of a start of an execution of a process;
    initiating, by the at least one processor, a time counter associated with measuring a time elapsed by the execution of the process, wherein the time counter is automatically initiated in response to encountering a fault during the execution of the process;
    comparing, by the at least one processor, the time elapsed by the execution of the process with a predetermined threshold timeout value;
    automatically generating, by the at least one processor, a report indicating the time elapsed by the execution of the process and whether the elapsed time exceeded the predetermined threshold timeout value; and
    promoting the report.

2. A non-transitory computer program product as in claim 1, wherein the operations further comprise determining that the elapsed time has exceeded the predetermined threshold timeout value, and in response to the determining, performing at least one of automatically terminating the time counter and initiating a debugger.

3. A non-transitory computer program product as in claim 1, wherein the operations further comprise automatically disabling the time counter at any time before, during or after execution of the process.

4. A non-transitory computer program product as in claim 1, wherein the process comprises a process scope, and the operations further comprise:
  selecting an action to be performed when the elapsed time exceeds the predetermined threshold timeout value, the action being selected based on the process scope from a group consisting of terminating the process, initiating a debugger, logging the exceeding of the threshold time, and allowing the process to continue; and
  performing the selected action upon determining that the elapsed time has exceeded the predetermined threshold timeout value.

5. A non-transitory computer program product as in claim 4, wherein the process scope comprises one of a user-specific scope, a server-wide scope, and a system-wide scope.

6. A non-transitory computer program product as in claim 1, wherein the promoting comprises at least one of displaying the report via a visual display device, generating an alert and delivering the alert to an individual or group tasked with quality control for development of a software architecture that includes the process, storing the report on a data storage device, and aggregating at least part of the report into an analysis of progress toward achieving quality goals associated with development of the software architecture that includes the process.

7. A system comprising:
  at least one processor; and
  at least one machine-readable medium storing instructions that, when executed by the at least one processor, cause the at least one processor to perform operations comprising:
    receiving an indication of a start of an execution of a process;
    initiating a time counter associated with measuring a time elapsed by the execution of the process, wherein the time counter is automatically initiated in response to encountering a fault during the execution of the process;
    comparing the time elapsed by the execution of the process with a predetermined threshold timeout value;
    automatically generating a report indicating the time elapsed by the execution of the process and whether the elapsed time exceeded the predetermined threshold timeout value; and
    promoting the report.

8. A system as in claim 7, wherein the operations further comprise determining that the elapsed time has exceeded the predetermined threshold timeout value, and in response to the determining, performing at least one of automatically terminating the time counter and initiating a debugger.

9. A system as in claim 7, wherein the operations further comprise at least one of automatically initiating and automatically disabling the time counter at any time before, during or after execution of the process.

10. A system as in claim 7, wherein the process comprises a process scope, and the operations further comprise:
  selecting an action to be performed when the elapsed time exceed the predetermined threshold timeout value, the action being selected based on the process scope from a group consisting of terminating the process, initiating a debugger, logging the exceeding of the threshold time, and allowing the process to continue; and
  performing the selected action upon determining that the elapsed time has exceeded the predetermined threshold timeout value.

11. A system as in claim 10, wherein the promoting comprises at least one of displaying the report via a visual display device, generating an alert and delivering the alert to an individual or group tasked with quality control for development of a software architecture that includes the process, storing the report on a data storage device, and aggregating at least part of the report into an analysis of progress toward achieving quality goals associated with development of the software architecture that includes the process.

12. A system as in claim 7, wherein the operations further comprise automatically initiating the time counter for a portion of the process.

13. A method comprising:
  receiving, by at least one processor, an indication of a start of an execution of a process;
  initiating, by the at least one processor, a time counter associated with measuring a time elapsed by the execution of the process, wherein the time counter is automatically initiated in response to encountering a fault during the execution of the process;
  comparing, by the at least one processor, the time elapsed by the execution of the process with a predetermined threshold timeout value;
  automatically generating, by the at least one processor, a report indicating the time elapsed by the execution of the process and whether the elapsed time exceeded the predetermined threshold timeout value; and
  promoting the report by the at least one processor.

14. A method as in claim 13, further comprising determining that the elapsed time has exceeded the predetermined threshold timeout value, and in response to the determining, performing at least one of automatically terminating the time counter and initiating a debugger.

15. A method as in claim 13, further comprising at least one of automatically initiating and automatically disabling the time counter at any time before, during or after execution of the process.

16. A method as in claim 13, wherein the process comprises a process scope, and the operations further comprise:
  selecting an action to be performed when the elapsed time exceed the predetermined threshold timeout value, the action being selected based on the process scope from a group consisting of terminating the process, initiating a debugger, logging the exceeding of the threshold time, and allowing the process to continue; and
  performing the selected action upon determining that the elapsed time has exceeded the predetermined threshold timeout value.

17. A method as in claim 16, wherein the process scope comprises one of a user-specific scope, a server-wide scope, and a system-wide scope.

* * * * *